United States Patent [19]

Shackle

[11] Patent Number: 5,721,070
[45] Date of Patent: Feb. 24, 1998

[54] ALKALI METAL ION BATTERY ELECTRODE MATERIAL

[76] Inventor: Dale R. Shackle, 17135 Oak Leaf Dr., Morgan Hill, Calif. 95037

[21] Appl. No.: 422,712

[22] Filed: Apr. 13, 1995

[51] Int. Cl.$^6$ .................................................. H01M 4/58
[52] U.S. Cl. .................................................. 429/218
[58] Field of Search .............................. 429/218, 5

[56] References Cited

U.S. PATENT DOCUMENTS

| | | | |
|---|---|---|---|
| 4,097,345 | 6/1978 | Shannon | 204/59 |
| 5,175,068 | 12/1992 | Ryan | 429/218 |
| 5,196,278 | 3/1993 | Idota | 429/218 |
| 5,286,582 | 2/1994 | Tahara et al. | 429/218 |
| 5,316,877 | 5/1994 | Thackeray et al. | 429/218 |
| 5,336,572 | 8/1994 | Koksbang | 429/218 |
| 5,427,875 | 6/1995 | Yamamoto et al. | 429/218 |

OTHER PUBLICATIONS

Julien and Nazari, *Solid State Batteries: Materials Design and Optimization*; Kluwer Academic Publishers, pp. 474–487, 1994 (no month).

Yong et al, "Hydrothermal Synthesis of MTi2(PO4)3 (M=Li, Na, K)", Mat. Res. Bull. vol.25, pp. 841–844, Jul. 1990.

*Primary Examiner*—Prince Willis, Jr.
*Assistant Examiner*—Carol Chaney
*Attorney, Agent, or Firm*—Herbert M. Hanegan; J. Rodgers Lunsford, III

[57] ABSTRACT

A metal ion intercalation compound suitable for use as the cathode material in an alkali metal battery. In one embodiment, a metal ion intercalation compound is mixed with an electrically conductive material. The metal ion intercalation compound is represented by the formula:

$$M_xT_yA_z$$

wherein M is an alkali metal ion, wherein T is a metal ion capable of existing in more than one stable oxidation state, and wherein A is a multi-element anion with a negative charge greater than 1.

4 Claims, 2 Drawing Sheets

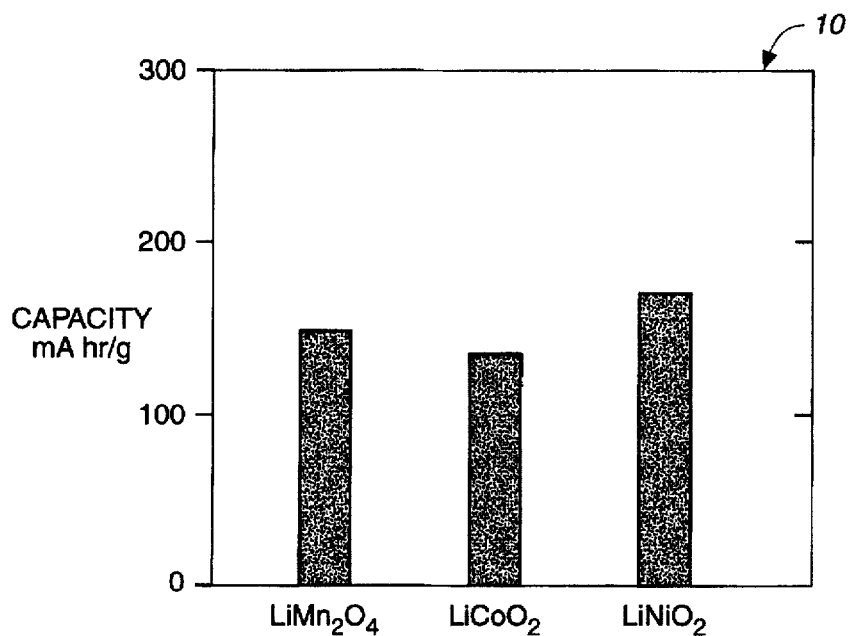
FIG._1
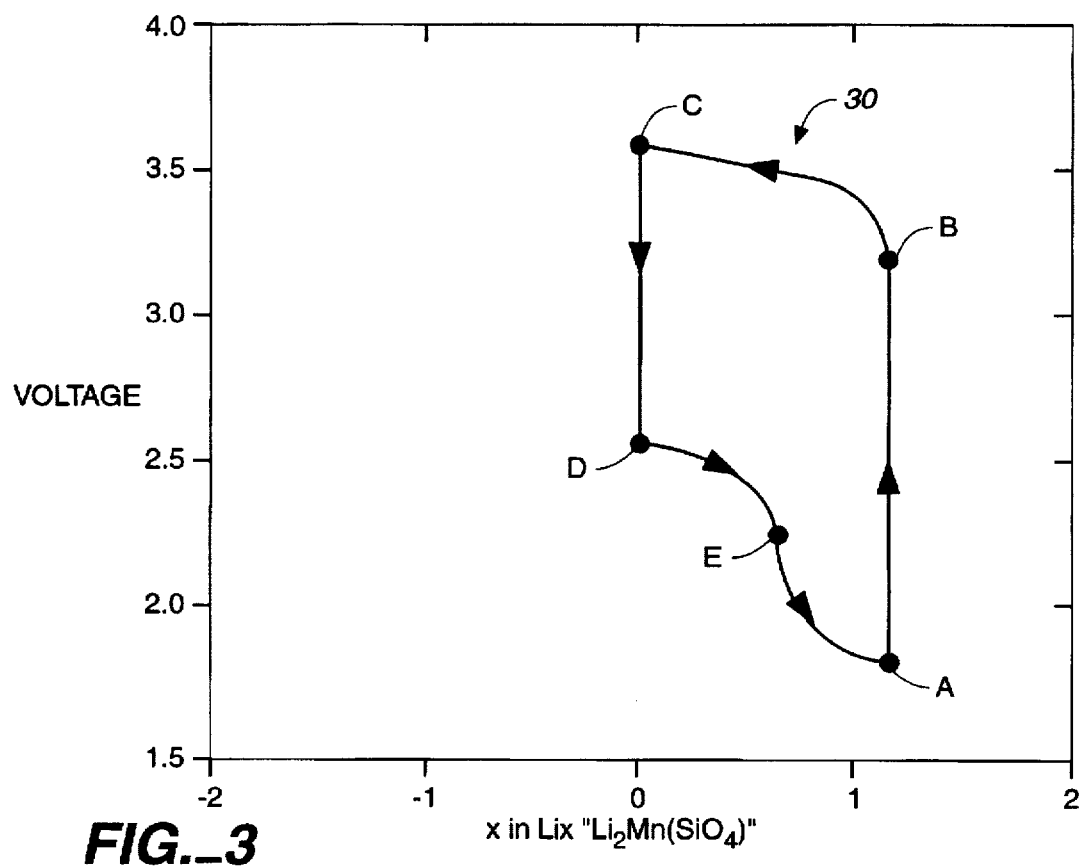
FIG._3

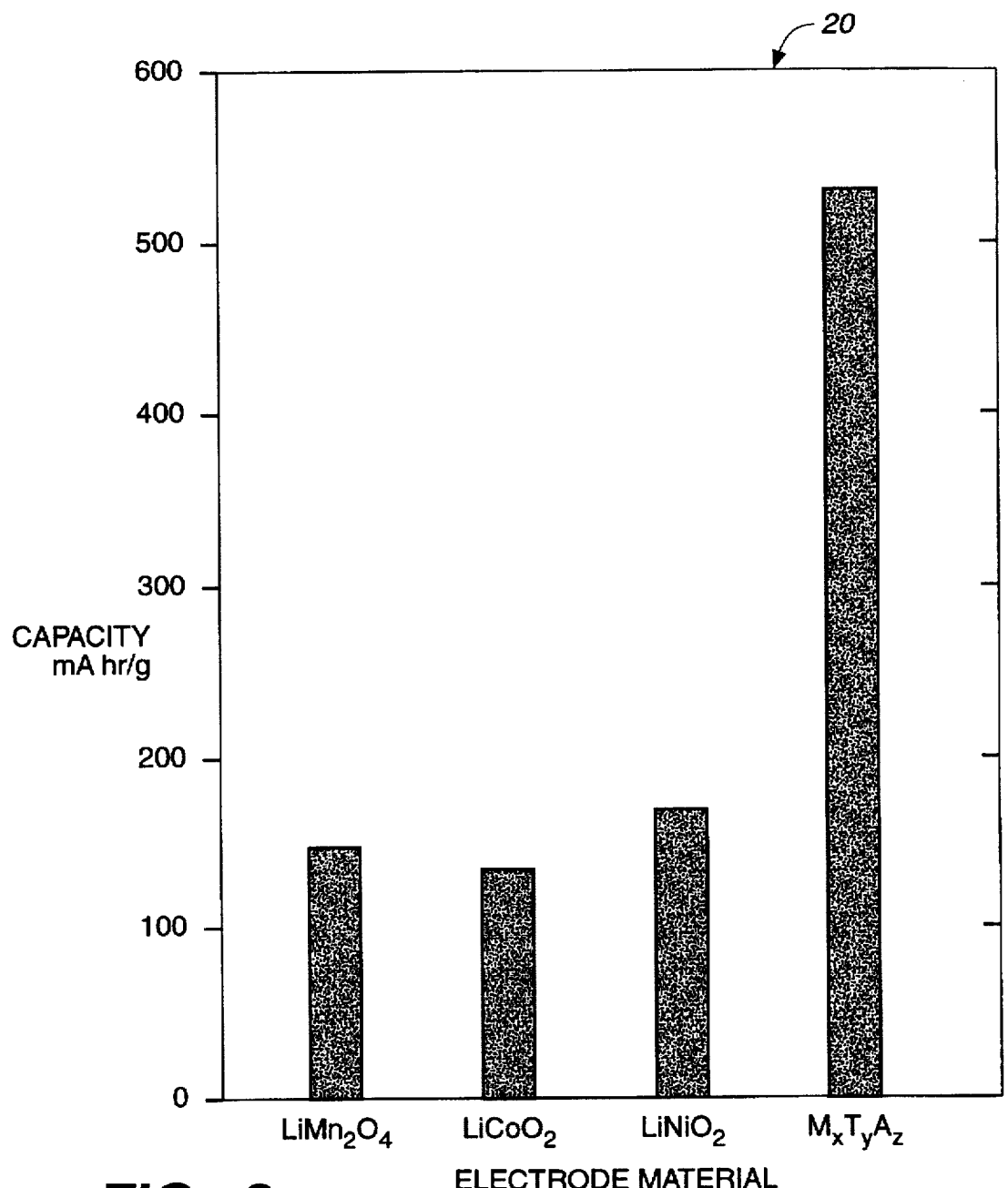
FIG._2

ALKALI METAL ION BATTERY ELECTRODE MATERIAL

TECHNICAL FIELD

The present invention relates generally to alkali metal ion batteries, and, more particularly, to electrode materials for alkali metal ion batteries.

BACKGROUND ART

Rechargeable metal-ion or "rocking-chair" batteries have been proposed for use in numerous fields. In a conventional metal-ion battery, an insertion compound having an open molecular structure capable of accepting and releasing metal ions is used as an electrode material. In addition to accepting and releasing metal ions, the electrode material must also be capable of accepting and releasing electrons, and must be able to exist in more than one stable oxidation state. Furthermore, for most commercial purposes, the electrode material must posses all of the above qualities at temperatures and under conditions at which battery power supplies are typically used. That is, the electrode material must operate effectively at and near room temperature and pressure. Furthermore, the electrode material must be able to operate under conditions to which, for example, portable electronic equipment might be exposed.

The amount of energy which can be released by the electrode material is dependent upon the number of metal ions and electrons which can be accepted and released by the electrode material. A particular difficulty associated with metal-ion batteries is achieving sufficient energy output from the electrode materials. For example, compounds such as $LiMn_2O_4$, $LiCoO_2$, and $LiNiO_2$, which are currently being used in lithium metal-ion batteries, have an energy output or "specific capacity" of under 200 milli-Ampere hours per gram (mAhr/g).

Thus, a need exists for a compound which has an open molecular structure capable of accepting and releasing metal ions, which is able to accept and release electrons, which is able to exist in more than one stable oxidation state at temperatures and under conditions at which battery power supplies are typically used, and which provides an energy output or specific capacity greater than that of compounds currently being used in metal-ion batteries.

DISCLOSURE OF THE INVENTION

It is, therefore, an object of the present invention to provide a compound which has an open molecular structure capable of accepting and releasing metal ions, which is able to accept and release electrons, which is able to exist in more than one stable oxidation state at temperatures and under conditions at which battery power supplies are typically used, and which provides an energy output or specific capacity greater than that of compounds currently being used in metal-ion batteries. The above object has been achieved by a metal ion intercalation compound suitable for use as the electrode material in an alkali metal battery. In one embodiment, a metal ion intercalation compound is mixed with an electrically conductive material. The metal ion intercalation compound is represented by the formula:

$M_xT_yA_z$ wherein M is an alkali metal ion, wherein T is a metal ion capable of existing in more than one stable oxidation state, and wherein A is a multi-element anion with a negative charge greater than 1. X, Y, and Z, as will be understood by one of ordinary skill in the art refer to the number of atoms/molecules of M, T, and A, respectively. In one embodiment of the present invention, the theoretical energy storage density of the present metal ion intercalation compound is approximately 332 mAhr/g. Thus, the present invention provides a metal ion intercalation compound having an energy storage capability greatly in excess of that found in the prior art. Additionally, the metal ion intercalation compound of the present invention is well suited to use at temperatures and under conditions at which battery power supplies are typically used.

In one embodiment of the invention, the metal ion capable of existing in more than one stable oxidation state is selected from the group consisting of Mn, Ni, Fe, V, Ti, Co, Cu, Cr, Sn, Pb, W, and Mo. In another embodiment, the multi-element anion with a negative charge greater than 1 is selected from the group consisting of $SiO_4$, $TiO_4$, $VO_4$, $FeO_4$, $MnO_4$, and $PO_4$.

The metal ion intercalation compound of the present invention is formed, in one embodiment, by hydrothermal synthesis. In another embodiment, the metal ion intercalation compound is formed using high temperature procedures. In yet another embodiment, the metal ion intercalation compound of the present invention is formed by self-organization synthesis.

Thus, the present invention provides a compound which is capable of accepting and releasing metal ions and electrons, which is able to exist in more than one stable oxidation state at temperatures and under conditions at which battery power supplies are typically used, and which provides an energy output or specific capacity greater than that of compounds currently being used in metal-ion batteries.

BRIEF DESCRIPTION OF THE DRAWINGS

The accompanying drawings which are incorporated in and form a part of this specification, illustrate embodiments of the invention and, together with the description, serve to explain the principles of the invention:

FIG. 1 is a bar graph of the specific capacity of several conventional electrode materials.

FIG. 2 is a bar graph of the specific capacity of several conventional electrode materials and the specific capacity of the electrode material of the present invention.

FIG. 3 is a graph of a single cycle of an alkali metal battery test wherein the cathode of the battery contains a metal ion intercalation compound represented by the formula $M_xT_yA_z$ in accordance with the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

In order to design a material suitable for use as an electrode in an alkali metal battery, several functional requirements must be met. The metal ion intercalation compound must possess the ability to conduct metal ions, the metal ion intercalation compound must be able to conduct electrons, and the metal ion intercalation compound must be able to exist in more than one stable oxidation state. Furthermore, the metal ion intercalation compound must meet the above-listed functional requirements at temperatures and under conditions at which battery power supplies are typically used.

In order to facilitate the exchange of metal ions, the molecular structure of the metal ion intercalation compound must contain pores or channels through which the metal ions can be conducted. It is well known in the art that the theoretical maximum energy output or specific capacity of the electrode material is determined by the number of metal ions which are exchanged between the electrodes.

The mechanism of energy storage in rechargeable metal ion batteries, and, particularly, in lithium metal ion batteries is well known in the art. Insertion or intercalation compounds are combined with an electrically conductive material to form an electrode. Typically, the metal ion intercalation compound is mixed with a carbonaceous material to form the electrode structure. However, the metal ion intercalation compound of the present invention is also well suited to other electrode formation techniques well known in the art. For example, the metal ion intercalation compound of the present invention is also well suited to being incorporated into the structure of a conductive polymer during the synthesis of the polymer. The electrode materials including the metal ion intercalation compound allow for the exchange of electrons and metal ions between an anode and a cathode. The exchange of the metal ions and electrons induces reversible changes in the electrode materials. The changes induced by the exchange of the metal ions and electrons include reversible changes in the oxidation state of the electrode materials.

With reference now to FIG. 1, a bar graph 10 of the specific capacity of several conventional electrode materials is shown. As shown in graph 10 conventional electrode materials such as $LiMn_2O_4$, $LiCoO_2$, and $LiNiO_2$ have a specific capacity of under 200 milli-Ampere hours per gram (mAhr/g). Specifically, the experimentally determined values of the listed conventional electrode materials are as follows: $LiMn_2O_4$ has a specific capacity of 148 mAhr/g, $LiCoO_2$ has a specific capacity of 135 mAhr/g, and $LiNiO_2$ has a specific capacity of 170 mAhr/g. The specific capacity of the conventional electrode materials is limited by their molecular structure and by the fact that the molecular structure of the compounds change if additional metal ions, namely Li ions, are added to the compounds. More specifically, if additional metal ions are added to the conventional electrode materials in an attempt to create a compound with a higher specific capacity, the compounds are no longer reversible. That is, the compounds will no longer allow for the repeated exchange of metal ions and electrons.

With reference next to FIG. 2, a bar graph 20 of the specific capacity of several conventional electrode materials along with the specific capacity of the metal ion intercalation compound of the present invention is shown. As shown in graph 20 the metal ion intercalation compound of the present invention is substantially greater than the specific capacity of conventional electrode materials. In one embodiment of the present invention, the metal ion intercalation compound is represented by the formula:

$$M_xT_yA_z$$

wherein M is an alkali metal ion, wherein T is a metal ion capable of existing in more than one stable oxidation state, and wherein A is a multi-element anion with a negative charge greater than 1. The metal ion, $T_y$, capable of existing in more than one stable oxidation state, is selected from the group consisting of Mn, Ni, Fe, V, Ti, Co, Cu, Cr, Sn, Pb, W, and Mo. The multi-element anion, $A_z$, with a negative charge greater than 1, is selected from the group consisting of $SiO_4$, $TiO_4$, $VO_4$, $FeO_4$, $MnO_4$, and $PO_4$. In one embodiment of the present invention, the metal ion intercalation compound is represented by $Li_{20}Mn_4(SiO_4)_7$. In the present embodiment, the exchange of the metal (lithium) ions and the corresponding electrons can be illustrated by equation:

$$Li_{20}Mn^{+2}{}_4(SiO_4)_7 \rightleftarrows Mn^{+7}{}_4(SiO_4)_7 + 20e^- + 20Li+ \quad (1)$$

As shown in equation (1), when 20 electrons and 20 Lithium ions are removed from the compound the oxidation state of Manganese changes from +2 to +7. Thus, electrical neutrality of the compound is maintained.

Theoretically, 1 gram equivalent weight of a material will deliver 26.8 ampere hours. A gram-equivalent weight of a material is the molecular weight of a material, in grams, divided by the number of electrons involved/transferred in the chemical reaction. That is, Gram-equivalent weight=mol. weight/(# of electrons transferred)

Theoretical energy capacity=26.8 Ahr/(gram-equivalent weight)

For $Li_{20}Mn_4(SiO_4)_7$: Gram-equivalent weight=644/(20)= 50.1 grams

Theoretical energy capacity=26.8 Ahr/(50.1 grams)=535 mAhr/g

Although $Li_{20}Mn_4(SiO_4)_7$ is specifically recited, the present invention has numerous other embodiments represented by the formula:

$$M_xT_yA_z$$

wherein M is an alkali metal ion, wherein T is a metal ion capable of existing in more than one stable oxidation state, and wherein A is a multi-element anion with a negative charge greater than 1. The metal ion, $T_y$, capable of existing in more than one stable oxidation state, is selected from the group consisting of Mn, Fe, V, Ti, Co, Cu, Cr, Sn, Pb, W, and Mo. The multi-element anion, $A_z$, with a negative charge greater than 1, is selected from the group consisting of $SiO_4$, $TiO_4$, $VO_4$, $FeO_4$, $MnO_4$, and $PO_4$. As one of ordinary skill in the art will recognize, while the anions of the present invention are disclosed, for example, as $SiO_4$, the chemistry of the present invention is quite complex. In many cases, it is possible to have a number of different species present in a solution. The different species present in a solution are interrelated by variables such as pH, temperature, and concentration. Some examples of the different species which may be present in a solution formed according to the present invention are $Si_2O_9{}^{-10}$, $Si_2O_{17}{}^{-10}$, $Si_6O_{18}{}^{-12}$, $Si_2O_7{}^{-6}$, $SiO_3{}^{-2}$ and $Si_2O_5{}^{-2}$. Analogous different species may be present in other anion compounds disclosed in accordance with the present invention.

Additionally, in some embodiments of the present invention, it is necessary to "dope" the material by adding other anions to the metal ion intercalation compounds of the present invention. The most commonly added dopant are $O^{-2}$, $S^{-2}$, $OH^{-1}$, $F^{-1}$, and $Cl^{-1}$. The added dopants alter the properties of the metal ion intercalation compounds of the present invention. Specifically, The dopants are used to alter such properties as electronic conductivity. In some embodiments of the present invention, it is desired to dope the anion itself with ions such as $Al^{+3}$. As an example, the addition of $Al^{+3}$ ions produces aluminosilicate anions. Thus, available compounds formulated in accordance with the present invention include, for example.:

$Li_2Mn(SiO_4)$ $Li_2Mn(TiO_4)$ $LiMn(VO_4)$ $Na_{20}Mn_4(SiO_4)_7$ $Na_2Mn(SiO_4)$ $Na_{20}Mn_4(TiO_4)_7$ $Na_2Mn(TiO_4)$ $NaMn(VO_4)$ etc. . .

With reference next to FIG. 3, a graph 30 of a single cycle of an alkali metal battery test wherein the cathode of the battery contains the metal ion intercalation compound ($M_xT_yA_z$) of the present invention. In the present embodiment, the metal ion intercalation compound is $Li_2Mn$ $(SiO_4)$. During the present cycling test, the electrolyte was 1M $LiPF_6$ dissolved in 50/50 ethylene carbonate/diethyl carbonate (EC-DEC). Graph 30 plots the voltage of the battery (in volts) on the y-axis. The number of lithium ions (in moles) moving in and out of the metal ion intercalation compound, $M_xT_yA_z$, of the present invention is plotted on the x-axis.

With reference still to FIG. 3, starting at point A, a charging voltage is applied to the battery. The voltage potential rises from a low of approximately 1.6 volts, past point B at approximately 3.2 volts, to a peak at point C with a value of 3.7 volts. Once the battery is "fully" charged at point C, the battery circuit is closed to begin the exchange/transfer of lithium ions and electrons. As shown in graph 30, a voltage drop occurs from point C to point D. The voltage drop immediately reduces the output voltage to approximately 2.6 volts. Following the voltage drop, the exchange/transfer of lithium ions and electrons begins. As seen from graph 30, the battery employing a metal ion intercalation compound of the present invention, $M_xT_yA_z$, generates a voltage of approximately 2.5 volts from point D to point E. The generated voltage then begins to drop off and eventually returns to an initial value of approximately 1.6 volts at point A. In the present embodiment, the metal ion intercalation compound exchanges/transfers approximately 1.2 moles of lithium ions. The exchange/transfer of 1.2 moles of lithium ions corresponds to an energy output of 200 mAhr/g. The molecular weight of $Li_2Mn(SiO_4)$ is 160 grams/mole. The number of electrons transferred during a chemical reaction using such a compound is 1.2 moles. Therefore:

Gram-equivalent weight=160 grams/mole/(1.2 moles)= 134 grams

Energy capacity=26.8 Ahr/(134 grams)=200 mAhr/g.

Thus, the "experimental" or actual specific capacity of the metal ion intercalation compound of the present invention, $M_xT_yA_z$, is higher than the specific capacity of the conventional compounds shown in FIGS. 1 and 2.

The compound of the present embodiment, $Li_2Mn(SiO_4)$, represented by the formula $M_xT_yA_z$ in accordance with the present invention, is prepared by a self-organization synthesis. Specifically, 12.6 grams of $MnCl_2$ is dissolved in a solution containing 9.8 grams of cetyltrimethylammonium bromide in 100 ml of $H_2O$ to form a first solution. A second solution is then formed by dissolving 6.0 grams of silica and 1.1 grams of $LiOH$-$H_2O$ in 50 ml of $H_2O$. The second solution is then stirred into the first solution. A third solution is then formed by mixing 6.9 grams of $LiOH$-$H_2O$ in 30 ml of $H_2O$. The third solution is then stirred into the combination of the first and second solutions. Tho combined mixture of solutions is then heated at 100 degrees Celsius for 24 hours. The product of the mixture is then collected by filtration and dried. The dried product, $Li_2Mn(SiO_4)$, is then used as the metal ion intercalation compound of the electrode.

Hydrothermal synthesis of $Li_2Mn(SiO_4)$ is carried out in the same manner as the above-described self-organization synthesis of $Li_2Mn(SiO_4)$, with the exception that the 9.8 grams of cetyltrimethylammonium bromide is omitted, and the reaction is carried out at 150 degrees Celsius for 24 hours in a high pressure reactor. In order to prepare $Li_2Mn(SiO_4)$ using high temperature synthesis, 7.3 grams of lithium carbonate, 11.4 grams of Manganese (II) carbonate, and 6.0 grams of silica are mixed and ground to achieve an intimate mixture of the dry materials. The mixture is then heated at 1000 degrees Celsius for 24 hours in an inert gas environment.

Another compound of the present invention, $Mn_4Li_{20}$ $(SiO_4)_7$ represented by the formula $M_xT_yA_z$ is prepared, in one embodiment, by self-organization synthesis. Specifically, a clear alcohol solution comprising 20.8 grams of tetraethyl orthosilicate, 7.2 grams of $MnCl_2$, and 12.1 grams of $LiCl$ in 31 grams of ethyl alcohol is prepared. If required, additional alcohol is added only to the extent necessary to achieve solution. The clear alcohol solution is added during stirring to a water solution containing 9.8 grams of cetyltrimethylammonium bromide and 0.072 grams of HCl in 65 grams of $H_2O$. The mixture is allowed to age for 16 hours at room temperature. The solid product is then collected by filtration.

$Mn_4Li_{20}(SiO_4)_7$ can also be prepared by hydrothermal synthesis. 7.2 grams of $MnCl_2$ is dissolved in 100 grams of water. A second solution is then formed by dissolving 60 grams of tetramethylammonium silicate and 12 grams of LiOH in 50 grams of $H_2O$. The mixture is then heated at 150 degrees Celsius for 24 hours. The product is then collected by filtration and dried. In another embodiment of the present invention, $Mn_4Li_{20}(SiO_4)_7$ is prepared by high temperature synthesis. In order to prepare $Mn_4Li_{20}(SiO_4)_7$ using high temperature synthesis, 74 grams of lithium carbonate, 46 grams of Manganese (II) carbonate, and 42 grams of silica are mixed and ground to achieve an intimate mixture of the dry materials. The mixture is then heated at 1200 degrees Celsius for 24 hours in an inert gas environment. After cooling, the material is ready for use.

In another embodiment of the present invention, the metal ion intercalation compound is represented by the formula:

wherein M is an alkali metal ion, wherein T is a metal ion capable of existing in more than one stable oxidation state, and wherein B is a multi-atom anion with a negative charge greater than 1. The metal ion, $T_y$, capable of existing in more than one stable oxidation state, is selected from the group consisting of Mn, Fe, V, Ti, Co, Cu, Cr, Sn, Pb, W, and Mo.

In one embodiment of the present invention, the metal ion intercalation compound is represented by $Li_4MnO_3$. In the present embodiment, the exchange of the metal (lithium) ions and the corresponding electrons can be illustrated by equation:

$$Li_4Mn^{+2}O_3 \rightarrow Li_2Mn^{+4}O_3 + 2e^- + 2Li^+ \qquad (2)$$

As shown in equation (2), when 2 electrons and 2 Lithium ions are removed from the compound, the oxidation state of Manganese changes from +2 to +4. Thus, electrical neutrality of the compound is maintained.

The specific capacity of the compound of the present embodiment is calculated as follows:

Molecular weight=131 grams

The number of moles of electrons transferred=2

Gram-equivalent weight=131 grams/mole/(2 moles)=65.5 grams

Energy capacity=26.8 Ahr/(65.5 grams)=409 mAhr/g.

Thus, the "experimental" or actual specific capacity of the metal ion intercalation compound of the present invention, $M_xT_yB_z$, is higher than the specific capacity of the conventional compounds shown in FIGS. 1 and 2.

Although $Li_4MnO_3$ is specifically recited, the present invention has numerous other embodiments represented by the formula:

$$M_xT_yB_z$$

wherein M is an alkali metal ion, wherein T is a metal ion capable of existing in more than one stable oxidation state, wherein B is a anion with a negative charge greater than 1, and wherein the ratio of M to T is greater than 1. The metal ion, $T_y$, capable of existing in more than one stable oxidation state is selected from the group consisting of Mn, Fe, V, Ti, Co, Cu, Cr, Sn, Pb, W, and Mo. Thus, available compounds formulated in accordance with the present invention include:

$Li_4MnO_3$
$Li_4FeO_3$
$Li_4VO_3$
$Li_4CoO_3$
etc. . .

The compound of the present embodiment, $Li_4MnO_3$, represented by the formula $M_xT_yB_z$, in accordance with the present invention, is prepared by self-organization synthesis. Specifically, 24.5 grams of Manganese (II) acetate tetrahydrate is dissolved in 50 ml of $H_2O$ to form a first solution. A second solution is then formed by dissolving 60 grams of lithium 2-ethylhexanate in 100 ml of $H_2O$. The two solutions are then mixed together. The water from the two solutions is evaporated to yield a solid material. The solid material is then heated to 600 degrees Celsius in an inert gas environment for 8 hours. The dried product, $Li_4MnO_3$, is then used as the metal ion intercalation compound of the electrode. By having the ratio of M to T greater than 1, the number of metal ions present in the compound is increased. The increased number of metal ions results in a greater energy output.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An alkali metal ion battery which includes: an alkali metal ion-containing electrolyte; and a metal ion intercalation material comprising:

a metal ion intercalation compound represented by the formula:

$$M_xT_yA_z$$

wherein M is a metal ion selected from the group consisting of Li, Na, K, Rb, Cs, and Fr, wherein T is a metal ion capable of existing in more than one stable oxidation state selected from the group consisting of Mn, Ni, V, Ti, Co, Cu, Cr, Sn, Pb, W, and Mo, wherein A is a multi-element anion with a negative charge greater than 1, selected from the group consisting of $SiO_4$, $TiO_4$ and $MnO_4$, wherein x is from about 1 to about 20, wherein y is from about 1 to about 4, wherein z is from about 1 to about 7, and wherein said metal ion intercalation compound is formed by hydrothermal synthesis.

2. An alkali metal ion battery which includes: an alkali metal ion-containing electrolyte; and an alkali metal battery electrode material comprising:

an electrically conductive material having a metal ion intercalation compound integrated therewith, said metal ion intercalation compound represented by the formula:

$$M_xT_yA_z$$

wherein M is a metal ion, selected from the group consisting of Li, Na, K, Rb, Cs, and Fr, wherein T is a metal ion capable of existing in more than one stable oxidation state selected from the group consisting of Mn, Ni, V, Ti, Co, Cu, Cr, Sn, Pb, W, and Mo, wherein A is a multi-element anion with a negative charge greater than 1, selected from the group consisting of $SiO_4$, $TiO_4$ and $MnO_4$, wherein x is from about 1 to about 20, wherein y is from about 1 to about 4, wherein z is from about 1 to about 7, and wherein said metal ion intercalation compound is formed by hydrothermal synthesis.

3. An alkali metal ion battery which includes: an alkali metal ion-containing electrolyte; and an alkali metal battery electrode material comprising:

an electrically conductive material having a metal ion intercalation compound integrated therewith, said metal ion intercalation compound represented by the formula:

$$M_xT_yB_z$$

wherein M is a metal ion selected from the group consisting of Li, Na, K, Rb, Cs, and Fr, wherein T is a metal ion capable of existing in more than one stable oxidation state selected from the group consisting of Mn, V, Ti, Co, Cu, Cr, Sn, Pb, W, and Mo, wherein B is a multi-atom anion with a negative charge greater than 1, wherein the ratio of M to T is greater than 1, wherein x is from about 1 to about 20, wherein y is from about 1 to about 4, wherein z is from about 1 to about 7, and wherein said metal ion intercalation compound is formed by hydrothermal synthesis.

4. A metal-ion battery which includes: a metal ion-containing electrolyte; and an electrochemically active cathode material comprising:

an electrically conductive material having a metal ion intercalation compound integrated therewith, said metal ion intercalation compound represented by the formula:

$M_x T_y A_z$ wherein M is a metal ion selected from the group consisting of Li, Na, K, Rb, Cs, and Fr, wherein T is a metal ion capable of existing in more than one stable oxidation state selected from the group consisting of Mn, Ni, V, Ti, Co, Cu, Cr, Sn, Pb, W, and Mo, wherein A is a multi-element anion with a negative charge greater than 1 selected from the group consisting of $SiO_4$, $TiO_4$, $VO_4$, and $MnO_4$, wherein said intercalation compound has a neutral charge, wherein x is from about 1 to about 20 wherein y is from about 1 to about 4, wherein z is from about 1 to about 7, and wherein said metal ion intercalation compound is formed by hydrothermal synthesis.

* * * * *